April 6, 1937. J. Q. SHERMAN Re. 20,325
AIR COOLING APPARATUS
Original Filed Oct. 25, 1926 2 Sheets-Sheet 1
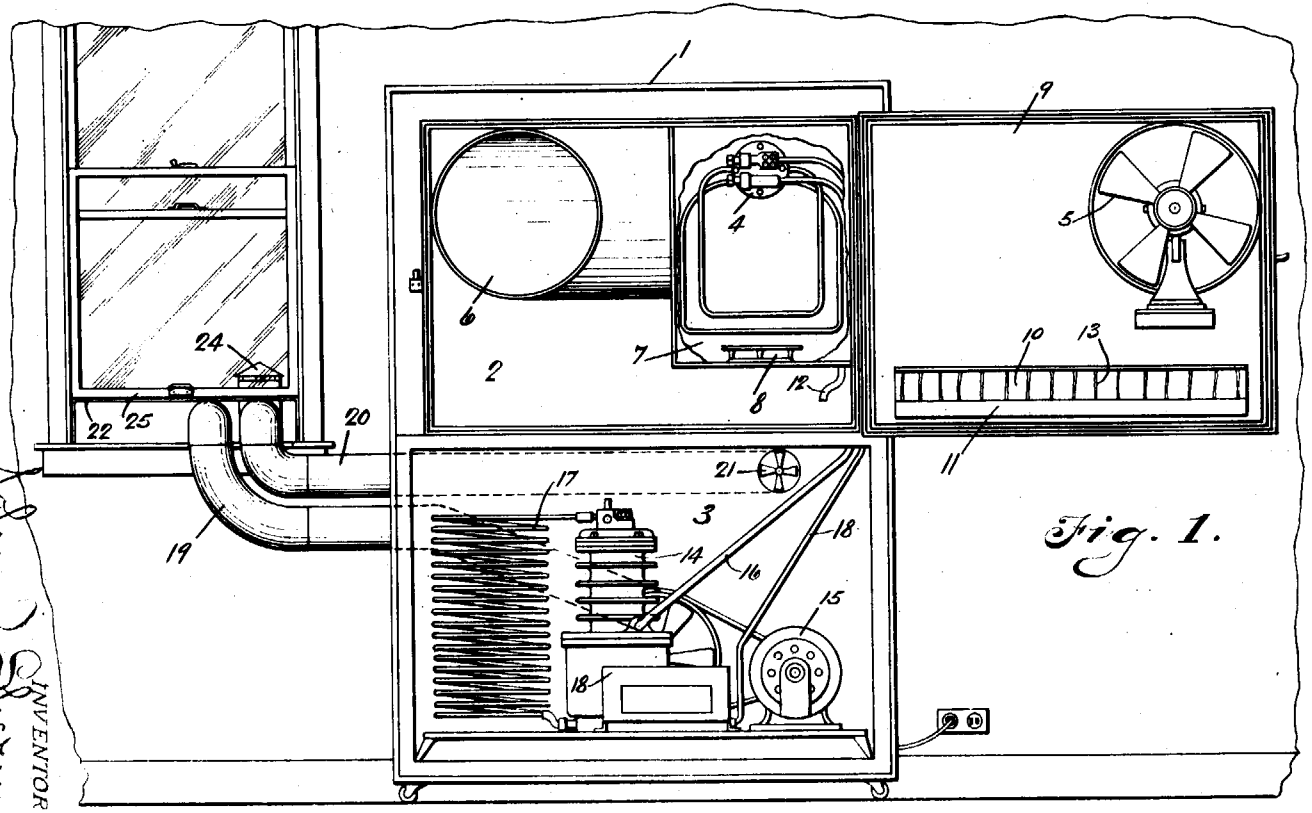
INVENTOR
John Q. Sherman
BY
W. E. Walker ATTORNEY April 6, 1937. J. Q. SHERMAN Re. 20,325

AIR COOLING APPARATUS

Original Filed Oct. 25, 1926 2 Sheets-Sheet 2

INVENTOR

BY John Q. Sherman

G. L. Walker ATTORNEY

Reissued Apr. 6, 1937 Re. 20,325

UNITED STATES PATENT OFFICE 20,325

AIR COOLING APPARATUS

John Q. Sherman, Dayton, Ohio

Original No. 1,890,626, dated December 13, 1932, Serial No. 143,992, October 25, 1926. Application for reissue March 6, 1933, Serial No. 659,877

27 Claims. (Cl. 62—129)

My invention relates to ventilating and air cooling systems for residences, offices, hospital rooms, hotels, clubs and the like and more particularly to the installation of a unitary cooling apparatus with means for dissipating the heat incident to its operation.

The present invention is a further development and amplification of the construction disclosed in my copending applications, Serial No. 118,783, filed June 26, 1926 and Serial No. 135,145 filed September 13, 1926, pertaining to air cooling and rehumidifying apparatus for treatment of air in closed rooms.

In the present invention there is contemplated a self contained cooling unit to be located in the room to be cooled and comprising a cabinet or housing divided into separate compartments. In one of these is located refrigeration or cooling coils and means for circulating air thereabout, which current of air is drawn from the room to be cooled and after passing over or through the refrigeration unit is returned to the room. In the second compartment which is insulated from the cooling compartment and from the room, is located the operating mechanism for the cooling unit, which in this case comprises a compressor, condenser, reservoir for refrigerant, and an actuating motor. This insulated compartment is provided with an air inlet conduit leading from a source outside the room, in the event that the compressor and condenser are air cooled units, and an outlet conduit for heated air discharging outside the room. In the event that a water cooled apparatus is employed, the air supply and discharge conduits apparatus outside the room are omitted.

The object of the invention is to provide a self contained air cooling unit of a semi-portable character which may be assembled at the place of manufacture and readily and easily installed as a complete unit, and which will be of increased efficiency, of pleasing appearance, and unlikely to get out of repair.

A further object of the invention is to provide means for operating such air cooling apparatus within a closed room without returning to the room the absorbed heat, but to the contrary discharging the absorbed heat outside the room.

With the above primary and other incidental objects in view as will more fully appear in the specification, the invention consists of the features of construction, the parts and combinations thereof and the mode of operation or their equivalents as hereinafter described and set forth in the claims.

Figure 3:
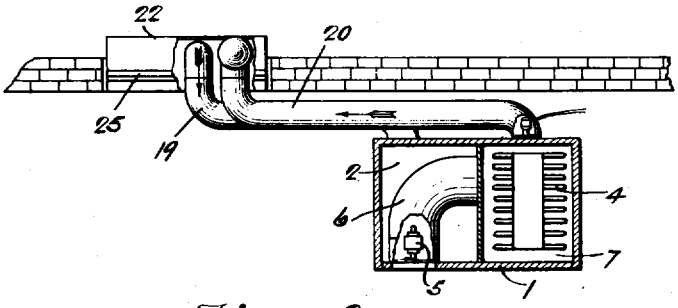
Figure 4:
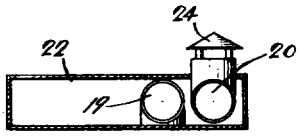
Figure 5:
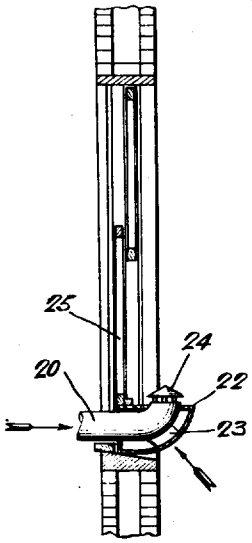
Figure 2:
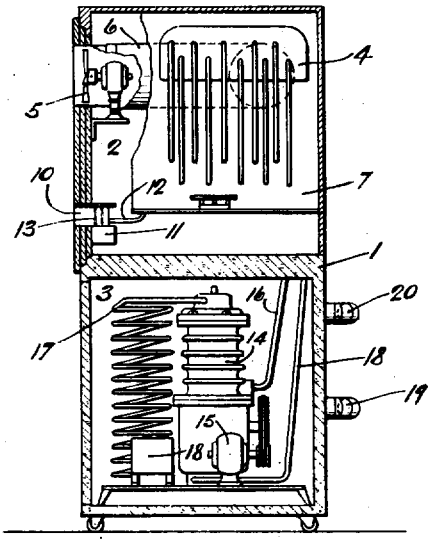

In the accompanying drawings wherein is shown the preferred but not necessarily the only form of embodiment of the invention Fig. 1 is a front elevation of an air cooling apparatus embodying the invention, the front of the cabinet or housing being shown open to expose to view the air cooling apparatus within. Fig. 2 is a further sectional view of the assembled apparatus. Fig. 3 is a sectional plan view. Fig. 4 is a front elevation of the window mounting for the air inlet and outlet conduits. Fig. 5 is a side elevation thereof showing the relation of the mounting and conduits to a window.

Like parts are indicated by similar characters of reference throughout the several views.

Referring to the accompanying drawings, 1 is a cabinet or housing divided into an upper compartment 2 and lower compartment 3. Inasmuch as the purpose is to cool the air outside the cabinet, the upper compartment 2 is not necessarily heat insulated. Located in this compartment is a cooling unit 4, which for purpose of illustration has been shown as a conventional form of refrigeration coil, but which may be of any other desired construction. The particular type of cooling unit is immaterial. A blower or fan, 5, illustrated as a conventional type of electric fan, located in the door of the compartment 2 draws air from the room and drives it through the air passage 6 into the chamber 7 in which the cooling unit 4 is located. The air circulates about the cooling unit and passes thence through an outlet opening 8 in the bottom of the chamber into the compartment 2.

The door 9 of the compartment has an exit opening 10 in the bottom through which the air escapes into the room. Beneath the opening 10 is a pan or trough like receptacle 11 into which drains the moisture of condensation through a spout 12 leading from the chamber 7. The condensation collected in the receptacle 11 may be augmented by an additional supply of water from time to time as required. Preferably an absorptive screen 13 of porous material, or a series of wicks is arranged inside the exit opening 10.

The lower portion of such screen of absorptive material is submerged in the water within the receptacle 11, and serves to elevate the moisture by capillary attraction into the path of the air current. More or less moisture is thus entrained in the passing air current, serving to rehumidify the air and restore the moisture lost by the cooling operation. If desired the absorptive screen 13 may be omitted. The water from the receptacle 11 will be partially evaporated by the passing current of air thus restoring to the air ample moisture.

The lower compartment 3 containing the operating mechanism is preferably heat insulated to prevent dissipation into the room of the extracted heat. In this compartment 3 is located the compressor 14 driven by the motor 15 and connected with the cooling unit 4 by a suction conduit 16. From the compressor the refrigerant is conducted through an air cooled condenser 17 passing thence into a receiver or reservoir 18 from which the refrigerant is returned to the cooling unit 4 through the supply conduit 18*a*. Briefly stated the refrigerating medium is supplied to the cooling unit as a liquid, where it is permitted to expand into a gas or vapor. In passing into its vaporous state the refrigerating medium absorbs heat from the air being circulated about the unit 4. When subjected to subsequent compression, this heat is given off in the compressor and in the condenser coil 17, as the refrigerant again returns to liquid form. This heat if allowed to be dissipated into the room would neutralize all beneficial effects of the air cooling operation. It is to prevent the radiation of this heat from the cabinet that the lower compartment is heat insulated. To provide for the cooling of the condenser coil 17 and the escape of the extracted heat an air inlet conduit 19 is provided, which leads to the interior of the compartment 3 from a source of air supply outside the room being cooled. An exhaust conduit 20 is also provided for discharging the warm air from the compartment 3 outside the room. This exhaust conduit is preferably provided with a blower or fan 21 to insure continuous circulation of air and thorough cooling of the compressor and condenser.

As a convenient and simple method of installing the air inlet and exhaust conduits, a mounting shield 22 is seated upon the sill of a window conveniently located adjacent to the cabinet 1. The air inlet and exhaust conduits lead to this shield or mounting through which the intake conduit has a downwardly turned inlet orifice 23, while the exhaust conduit discharges upwardly as at 24. This separation of the intake and exhaust orifices prevents the warm air being drawn back into the compartment through the intake conduit. The shield or mounting disguises the appearance of the conduits and the structure appears as a conventional type of window ventilator. The window sash 25 closes down upon the top of the mounting. Thus the device does not interfere with the opening and closing of the window and obstructs the window opening but very little.

In the event that a water cooled compressor and condenser are employed, the air inlet and exhaust conduits 19 and 20 may be omitted and the usual water connections utilized in place of these conduits.

From the above description it will be apparent that there is thus provided a construction of the character described possessing the particular features of advantage before enumerated as desirable but which obviously is susceptible of modification, in its form, proportions, and arrangement of parts, without departing from the principle involved or sacrificing any of its advantages.

While in order to comply with the statute the invention is described in language more or less specific as to structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In an air cooling apparatus, a cabinet separated into two compartments, a blower drawing air from a room to be cooled into one of said compartments, said compartment having an exit discharging back into said room, a receptacle for moisture of condensation contiguous to said exit, an absorbent screen overlying the exit from said compartment through which the air is passed, said absorbent screen being partly submerged in the contents of said receptacle, a refrigerating apparatus including a cooling unit located within said compartment, and including a compressor and condenser located in the second compartment, said second compartment being heat insulated from the first compartment and from the room to be cooled, and means for conducting the heat from said condenser and compressor and discharging same outside the said room.

2. In an air cooling apparatus, a cabinet separated into two compartments, a refrigerating apparatus including a cooling unit located in one of the compartments, and a compressor and condenser located in the other compartment, the latter compartment being heat insulated from the first compartment and from the room to be cooled, means for circulating air through the first compartment and discharging same into said room, a window mounting shield to be engaged beneath a sliding window sash, a pair of air conduits leading from said mounting shield to said second compartment, one of said conduits opening downwardly through said mounting shield and the other upwardly, and means for inducing a circulation of air inwardly through one of said conduits to said compartment and outwardly through the other therefrom.

3. In an air cooling apparatus, a cabinet separated into two compartments, a refrigerating apparatus including a cooling unit located within one of said compartments, a complementary heat exchange unit located in the second compartment, said second compartment being heat insulated from the first compartment and from the room to be cooled, a moisture receiving receptacle mounted to receive a condensation from the cooling unit, a conduit for supplying water to said receptacle, and means for circulating air from the room to be cooled into and about the cooling unit to which air moisture is supplied from said receptacle during its circulation in the cooling compartment.

4. In an air conditioning apparatus, a cooling compartment, a refrigerating unit located in said cooling compartment, a complementary heat exchange unit insulatingly separated from the cooling compartment and from the room to be cooled, a moisture receiving receptacle located in proximity to the cooling unit for receiving condensation deposited on the cooling unit, a conduit for supplying water to said receptacle and means for transferring moisture from said receptacle to the air in the room, said means including a blower drawing air from the room into proximity to the receptacle in the cooling compartment to increase the moisture content thereof.

5. In an air cooling apparatus, a cabinet separated into two compartments, a blower drawing air from a room to be cooled into one of said compartments, said compartment having an exit discharging back into the room, a refrigerating apparatus including a cooling unit located within said compartment, a complementary heat exchange unit located in a second compartment, said second compartment being heat insulated from the first compartment and from the room to be cooled, a moisture receiving receptacle mounted to receive condensation from the cooling unit, the surface of the moisture in the receptacle being subjected to evaporation by the air circulate by the blower.

6. In a device for conditioning the air of a room, a compartment having an opening communicating with the room, a cooling unit in the compartment, means for supplying the refrigerant to the cooling unit, means associated with said compartment for receiving condensation condensed by the cooling unit, a conduit for supplying water to the second means and means for circulating a current of air from the compartment into the room, the current of air evaporating moisture from said second means for supplying moisture to the air in the room.

7. In a device for conditioning the air of a room, a compartment having an opening associated with the room to be air conditioned, a cooling unit mounted in said compartment, a receptacle for receiving the condensation draining from the cooling unit, means for supplying moisture to the receptacle from an external water supply, and a blower for causing a current of air to circulate from the compartment to the room, said current of air absorbing moisture from said receptacle so as to supply moisture to the air in the room.

8. In a device for conditioning the air of a room, a compartment having an opening communicating with the room, a cooling unit mounted in said compartment, a complementary unit for supplying a refrigerant to said cooling unit, means associated with said cooling unit for receiving the moisture draining therefrom, a supply pipe for adding additional moisture to said means, and a blower means for circulating a current of air from said compartment to the room, said current contacting said first means so as to supply additional moisture to the air in the room.

9. In an air conditioner for a room, a refrigerating unit, means for supplying refrigerant medium thereto, a compartment in which the unit is located having an outlet opening into a room to be cooled, means for propelling a current of air upon the refrigerating unit within the compartment and thence through the outlet into the room, a drain tray having an overflow pipe associated with said unit for receiving condensation accumulating on said coils, and a second tray adapted to receive water to be supplied to the air propelled by said means.

10. In an air cooling apparatus, a cabinet separated into two compartments, a refrigerating apparatus including a cooling unit located in one of the compartments, and a compressor and condenser located in the other compartment, the latter compartment being heat insulated from the first compartment and from the room to be cooled, means for circulating air through the first compartment and discharging same into said room, means for ventilating said second compartment, said means including air conduits removably connected to an opening of a wall of a room to be cooled, a sealing unit connecting the conduits to the wall, and means for inducing a circulation of air through the second compartment from the exterior of the room.

11. In an air cooling apparatus, a cabinet separated into two compartments, a cooling unit located in one of the compartments, and a complementary heat exchange unit located in the other compartment, the latter compartment being heat insulated from the first compartment and from the room to be cooled, means for circulating air through the first compartment and discharging same into said room, means for ventilating the second compartment including conduits extending from said compartment to an opening of the wall of the room to be cooled, and a sealing unit for removably connecting said conduits to the opening of the room so that air may circulate from the exterior of the room around the complementary unit in said second compartment.

12. In an air conditioning apparatus for rooms, a refrigerating unit, a complementary heat exchange unit thermally isolated from the refrigerating unit and from the room to be cooled, ventilating mechanism for cooling the complementary heat exchange unit, means for receiving condensation resulting from the cooling of the air, and a propeller for circulating the air of the room about said refrigerating unit and in proximity to said means for transferring moisture from said means to the air to increase the moisture content thereof.

13. In an air cooling apparatus for rooms, a cooling unit, a blower for circulating the air of the room over said cooling unit, a complementary heat exchange unit thermally isolated from the cooling unit and from the room to be cooled, a moisture receiving receptacle contiguous to the path of the circulated air to receive condensation from the cooling unit, the moisture within the receptacle being subject to evaporation by the circulation of air by the blower, and means for supplying additional water to said receptacle.

14. In an air conditioning device for a room, a refrigerating unit, means for supplying refrigerant medium thereto, means for circulating air of the room to be cooled about the refrigerating unit, a receptacle for water of condensation adjacent which the air is circulated for re-evaporation of the water to thereby increase the moisture content of the air, and means for supplying water to said receptacle.

15. In an air conditioning device for a room, a refrigerating unit including, cooling coils, means for supplying refrigerant medium thereto, means for circulating air of the room to be cooled about the refrigerating unit, means for collecting condensation from the cooling coils, moisture supplying means in the proximity of which the air is circulated for evaporation to increase the moisture content of the air, and means for supplying water to said moisture supplying means.

16. In an air conditioning apparatus for rooms, a cooling unit, a complementary heat exchange unit thermally isolated from the cooling unit and from the room to be cooled, a condensation receiver for receiving the condensation from the air circulated in proximity to the cooling unit, an evaporator in proximity to the air circulated about the cooling unit, said evaporator increasing the moisture content of the air, and means for supplying water to said evaporator.

17. An air cooling apparatus, including a cabinet having two compartments, a cooling unit located in one of the compartments and a complementary heat exchange unit located in another compartment, the latter compartment being heat insulated from the first compartment and from the room to be cooled, said first compartment having openings in the wall thereof for circulating air therethrough from the room, means for ventilating the second compartment including a conduit extending from said second compartment into an opening in the wall of the room, and means for detachably mounting the conduit in said opening in the wall so that air may circulate from the exterior of the room around the complementary unit in said second compartment.

18. An air cooling apparatus including a cabinet having two compartments insulated from one another, a cooling unit located in one of the compartments and a complementary heat exchange unit located in the other compartment, one of said compartments having vents for circulating the air surrounding said cabinet around the unit located in said compartment, means for circulating air around the unit in the second compartment including a conduit extending from said compartment to an opening in a wall in the room to be cooled, and a shield located in said opening for removably connecting said conduit to the opening in the wall.

19. In a device for conditioning the air of a room, a compartment having an opening associated with the room to be air conditioned, a cooling unit located in said compartment, a receptacle for receiving condensation drained from said cooling unit, a conduit for supplying water to said receptacle, and means for circulating the air from the compartment to the room, said air absorbing moisture from the receptacle so as to moisten the air in the room.

20. In a conditioning apparatus for room air, means for circulating air to be conditioned, a closed refrigerant circulating system including an evaporator in the path of the circulated air and normally tending to collect moisture thereon, said system also including a condenser, a cooling fluid medium flowing in heat exchange relationship with a heat rejecting portion of said system, means for receiving water dripping from said evaporator, and means communicating with and extending into the path of cooled air to be discharged into the room, said last named means being rendered effective by passage of circulated air therethrough for continuously removing water from the water receiving means and present it in the path of the air to be discharged.

21. In a device for conditioning the air of a room, a compartment having an opening associated with the room to be air conditioned, a cooling unit located in said compartment, a receptacle for receiving condensation drained from said cooling unit, a conduit for supplying water to said receptacle, and means for circulating the air from the compartment to the room, an absorptive screen supported in the cabinet and extending into the receptacle, said air absorbing moisture from the receptacle and the screen so as to moisten the air in the room.

22. In a device for conditioning the air of a room, a compartment having an opening associated with the room to be air conditioned, a cooling unit located in said compartment, a receptacle for receiving condensation drained from said cooling unit, and a screen extending into the receptacle, a conduit for supplying water to the receptacle, said receptacle and screen being arranged in the path of the air circulating through the cabinet.

23. An apparatus for conditioning air in a room having a window, comprising a portable cabinet separate from the walls of said room and movable into and out of said room, said cabinet to be placed in said room and having a first compartment and a second compartment, means forcibly circulating air through said first compartment into the room, means including a circulated heat exchange mechanism for producing a heat exchange action and removing moisture from air circulated through said first compartment, means for circulating said medium from said first compartment to said second compartment, means in said second compartment for restoring said medium to its original condition to render it capable again of producing a heat exchange action and removing moisture from air circulated through said first compartment, conduit means extended from said second compartment to said window, and a sealing unit for removably connecting the conduits and the window so that air may circulate from the exterior of the room around the means in said second compartment for restoring the circulated medium to its original condition.

24. An apparatus for conditioning air in a room having a window, comprising a portable cabinet separate from the walls of said room and movable into and out of said room, said cabinet to be placed in said room and having a first compartment and a second compartment, means for forcibly circulating a first stream of air through said first compartment into said room, means including a circulated medium for producing a heat exchange action and removing moisture from said first stream of air circulated through said first compartment, means for circulating said medium from said first compartment to said second compartment, means in said second compartment for restoring said medium to its original condition to render it capable again of producing a heat exchange action and removing moisture from air circulated through said first compartment, conduit means for circulating a second stream of air to and from the exterior of said room through said window and through said second compartment to aid in restoring said medium and thence to the exterior of said room through said window and a sealing unit for removably connecting the conduits with the window to close off passage of outside air by way of the window except through said conduit.

25. An apparatus for conditioning air in a room having a window, comprising a portable cabinet separate from the walls of said room and movable into and out of said room, said cabinet to be placed in said room and having an air conditioning compartment, means forcibly circulating air through said compartment and into said room, means for producing heat exchange action and removing moisture from air circulated through said compartment, and a conduit extending to said window from said cabinet, said conduit receiving air from outside said room through said window, and renewing means to which the air from outside said room is directed and effective to render the removing means capable of again producing a heat exchange action and removing moisture from the air circulated through said cabinet compartment and into the room, and a sealing unit for removably connecting the conduit with the window to close off passage of outside air by way of the window except through said conduit.

26. An apparatus for conditioning air in a room having a window, comprising a portable cabinet separate from the walls of said room and movable into and out of said room, said cabinet to be placed in said room and having an air conditioning compartment, means forcibly circulating air through said compartment and into said room, means for producing a heat exchange action and removing moisture from air circulated through said compartment, a conduit extending to said window from said cabinet, said conduit discharging outside said room through said window heat generated incident to removal of moisture from the air circulated through said cabinet compartment and into the room, and a sealing unit removably connecting said conduit with the window to close off passage of outside air by way of the window except through said conduit.

27. An apparatus for conditioning air in a room having a window, comprising a portable cabinet separate from the walls of said room and movable into and out of said room, said cabinet to be placed in said room and having an air conditioning compartment, means forcibly circulating air through said compartment and into said room, means for producing a heat exchange action and removing moisture from air circulated through said compartment, a conduit extending to said window from said cabinet, means in said cabinet for restoring said heat exchange and moisture removing means to its original condition to render it again capable of producing a heat exchange action and removing moisture, means for circulating air thereabout and discharging the air outside the room through said window, and a sealing unit removably connecting the conduit with the window to cut off passage of air past the window except by way of the conduit.

JOHN Q. SHERMAN.